UNITED STATES PATENT OFFICE.

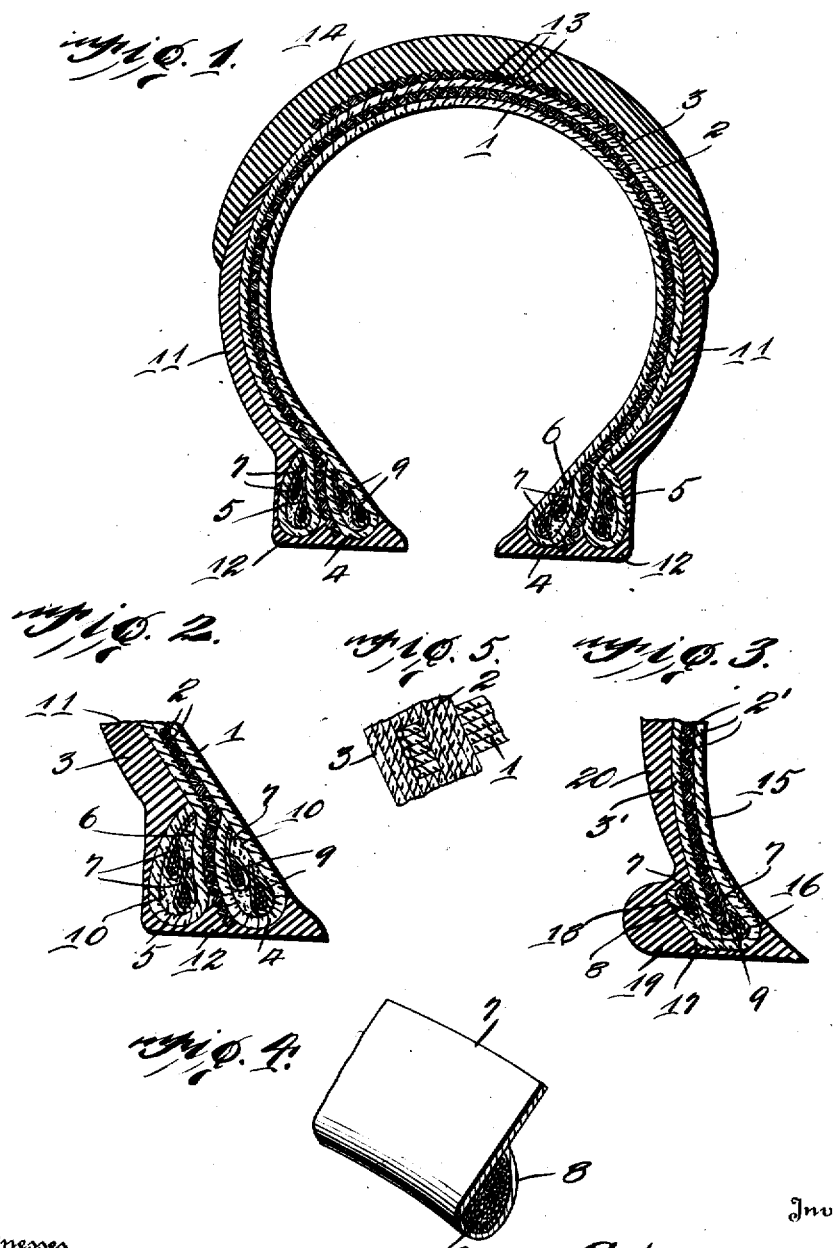

CHARLES L. ARCHER, OF MINNEAPOLIS, MINNESOTA.

PNEUMATIC CORD TIRE.

1,211,035.  Specification of Letters Patent.  Patented Jan. 2, 1917.

Application filed January 26, 1916. Serial No. 74,497.

*To all whom it may concern:*

Be it known that I, CHARLES L. ARCHER, a citizen of the United States of America, residing at Minneapolis, in the county of Hennepin and State of Minnesota, have invented certain new and useful Improvements in Pneumatic Cord Tires, of which the following is a specification, reference being had therein to the accompanying drawing.

This invention relates to pneumatic tires for automobiles and like vehicles and has special reference to a cord tire.

The principal object of this invention is the production of a pneumatic cord tire which is so constructed as to provide efficient beads thereon for facilitating the retention of the tire upon the felly or rim of a wheel.

Another object of this invention is the production of a pneumatic cord tire wherein the cords have their end portions looped so as to fit about one or more wire cables or cable strips so as to constitute a plurality of beads for facilitating the retention of the tire upon the felly or rim of a wheel.

With these and other objects in view this invention consists of certain novel combinations, constructions, and arrangements of parts as will be hereinafter fully described and claimed.

In the accompanying drawing like characters of reference indicate like views in the several parts, wherein:

Figure 1 is a transverse section through the complete pneumatic cord tire as constructed in accordance with this invention. Fig. 2 is an enlarged fragmentary sectional view through a portion of the tire illustrating very clearly the construction of one of the beads. Fig. 3 is a fragmentary sectional view through a slightly modified form of the tire, illustrating another way in which the bead may be formed. Fig. 4 is a detail fragmentary perspective view of one of the cable strips. Fig. 5 is a fragmentary perspective view of a portion of the tire, illustrating the manner in which the layers of cords extend in relation to each other.

Referring to the accompanying drawing by numerals it will be seen that 1 designates the inner transversely extending cords which fit within the longitudinally extending cords 2, while the outer transversely extending cords 3 fit upon the longitudinal cords 2, as clearly shown in Figs. 1 and 5. By this construction it will be seen that the longitudinal cords 2 are interposed between the transversely extending cords 1 and 3, thereby forming a very strong body for the tire.

The ends of the inner transversely extending cords 1 are looped over as shown at 4, as are the ends of the transversely extending cords 3, as shown at 5. Therefore, it will be seen that the looped ends 4 and 5 of the cords 1 and 3 will provide the longitudinally extending pockets 6.

The cable strip 7 has a looped portion 8 fitting about the wire cable 9, which cable will form a very rigid body for the cable strip 7. As many of these cable strips as desired may be positioned within the longitudinally extending pockets 6 formed by the looped portions 4 and 5 of the transversely extending cords, as will fill these pockets. After these cable strips having their cables 9 are positioned within the pockets and are wedged therein, a suitable filler, such for instance as soft rubber, as shown at 10, may then be forced into or positioned within the pockets 6 so as to fill the same, as clearly shown in Fig. 2, thereby preventing any tendency of the cable strips to shift or the beads to lose their correct shape after the tire has been completely assembled. It will be seen that the longitudinal cords 2 will also be interposed between the looped ends of the transversely extending cords, as shown in Figs. 1 and 2, thereby holding the looped ends 4 and 5 in their correct spaced relation relative to each other.

The side walls 11 are then positioned upon the outer transversely extending cords 3 so as to allow the heels 12 to be positioned upon the looped ends of the transversely extending cords, whereby these looped ends and the heels 12 will constitute efficient beads which may be positioned upon the rim or felly of a wheel so as to support the pneumatic tire in engagement therewith. The breaker cords 13 are then positioned upon the tread portions of the outer transversely extending cords 3 and are held in position by means of the tread 14 which is positioned upon the breaker cords 13, the transversely extending cords 3, and the side walls 11.

It is obvious that after these several elements have been positioned upon each other the entire tire if so desired, may be rubberized so as to constitute an efficient and compact one-piece pneumatic tire which is so constructed as to present a very yieldable and resilient tire, while the cords extend so as to minimize the possibility of the tire being punctured or blown out when in operation.

As shown in Fig. 3, a slightly modified form of the device may be employed, wherein the outer transversely extending cords 3' fit upon the longitudinally extending cords 2'. The inner transversely extending cords 15 are bulged inwardly, as shown at 16, and are then looped over as indicated at 17, whereby the looped over portions of the inner transversely extending cords 15 will pass over the ends of the outer transversely extending cords 3', since the ends of the transversely extending cords 3' terminate substantially evenly with the longitudinally extending cords 2'. The cable strip 7 may be positioned so as to fill the bulged portion 16, while another cable strip 7 may fit upon the outer transversely extending cords adjacent their ends so as to engage the ends 18 of the looped over portions 17 of the transversely extending cords 15. The heel 19 may be positioned upon the looped over portions 17 of the transversely extending cords 15, at which time the entire device may be rubberized so as to constitute a substantially one-piece structure, since the side wall 20 of the heel 19 will fit upon the outer transversely extending cords 3' as clearly shown in Fig. 3. Thus, it will be seen that since the looped over portions 17 of the transversely extending cords 15 provide sufficient space for the interposition of a number of cable strips and cables a very strong bead has been provided for facilitating the retention of the complete tire upon the rim or felly of a wheel.

From the foregoing description it will be seen that a very simple and efficient pneumatic cord tire has been produced which is so constructed as to remain in its correct shape after being assembled and which is formed so as to cause the looped ends of the transverse cords to be reinforced by carrying cable strips to constitute efficient beads for the purposes hereinbefore presented.

What is claimed is:

1. In a pneumatic cord tire, the combination of a plurality of transversely extending cords, longitudinally extending cords positioned upon said transversely extending cords, said transversely extending cords having their ends looped over to provide longitudinal pockets, cable strips positioned within said pockets, said cable strips comprising strips having looped over portions, and cables carried within the looped over portions, whereby said cable strips will hold said looped over portions of said transversely extending cords in their correct positions, and an outer cover positioned upon said cords.

2. In a pneumatic cord tire, the combination of a plurality of transversely extending cords, longitudinally extending cords positioned upon said transversely extending cords, said transversely extending cords having their ends looped over to provide longitudinal pockets, cable strips positioned within said pockets, said cable strips comprising strips having looped over portions, cables carried within the looped over portions, whereby said cable strips will hold said looped over portions of said transversely extending cords in their correct positions, filler means positioned within said longitudinally extending pockets so as to resist any tendency of the shifting of said cable strips, whereby said looped over portions of said transversely extending cords will constitute beads, and an outer covering positioned upon said beads and cords.

3. In a device of the class described, the combination of a plurality of longitudinally extending cords, transversely extending cords positioned upon said longitudinally extending cords, cable strips positioned upon said transversely extending cords, each cable strip comprising a fabric body having a loop portion, a cable positioned within said loop portion, and means for holding said strips in fixed positions upon said transversely extending cords for constituting heels therefor.

4. In a device of the class described, the combination of a plurality of longitudinally extending cords, transversely extending cords positioned upon said longitudinally extending cords, the outer ends of said transversely extending cords being looped over to provide longitudinal pocket portions, cable strips positioned within said pocket portions, each cable strip comprising a fabric body having a loop portion, a cable positioned within said loop portion, whereby heels will be formed adjacent the outer longitudinally extending cords.

5. In a device of the class described, the combination of a plurality of longitudinally extending cords, transversely extending cords positioned upon said longitudinally extending cords, the outer ends of said extending cords, transversely extending cords being looped over to provide longitudinally bulged or pocket portions, cable strips carried within said longitudinally bulged or pocket portions, thereby forming extra thickened portions resting upon said longitudinally extending cords, thereby forming heels.

6. In a device of the class described, the combination of a plurality of longitudinally extending cords, transversely extending cords positioned upon said longitudinally extending cords, the outer ends of said transversely extending cords being looped over to provide longitudinally bulged or pocket portions, cable strips carried within said longitudinally bulged or pocket portions for filling the same, thereby forming enlarged portions resting upon said longitudinally extending cords, and an outer casing positioned upon said transversely extending cords and fitting over the loped ends thereof for holding said looped ends in their correct positions.

7. In a device of the class described, the combination of a plurality of longitudinally extending cords, transversely extending cords positioned so as to rest within said longitudinally extending cords, transversely extending cords positioned so as to rest upon the outer portions of said longitudinally extending cords, all of said transversely extending cords having their outer ends looped over to provide entirely inclosed longitudinal pocket portions, and cable strips positioned within said longitudinal pocket portions, whereby the looped over ends of said transversely extending cords will positively hold said cable strips in said pockets.

In testimony whereof I hereunto affix my signature.

CHARLES L. ARCHER.